United States Patent [19]

Koschinat et al.

[11] Patent Number: 5,060,916
[45] Date of Patent: * Oct. 29, 1991

[54] PLUNGER PISTON SYSTEM

[75] Inventors: B. Hubert Koschinat, Hosbach-Winzenhohl; Manfred Fröhlke, Ottweiler, both of Fed. Rep. of Germany

[73] Assignee: Otto Sauer Achsenfabrik Keilberg, Bessenbach-Keilberg, Fed. Rep. of Germany

[*] Notice: The portion of the term of this patent subsequent to Jan. 2, 2007 has been disclaimed.

[21] Appl. No.: 414,528

[22] Filed: Sep. 29, 1989

Related U.S. Application Data

[63] Continuation-in-part of Ser. No. 242,412, Sep. 9, 1988, Pat. No. 4,890,823.

[30] Foreign Application Priority Data

Jul. 20, 1988 [DE] Fed. Rep. of Germany ....... 3824542
Jul. 8, 1989 [EP] European Pat. Off. ........ 89112535.3

[51] Int. Cl.[5] ............................ B25G 3/00; F16F 9/04
[52] U.S. Cl. .................................. 267/64.27; 280/711; 267/122
[58] Field of Search ................... 267/64.11, 64.27, 35, 267/64.19, 64.21, 64.23, 64.24, 122, 123, 124; 280/711, 712; 403/377; 92/98 D, 90, 99, 255

[56] References Cited

U.S. PATENT DOCUMENTS

| 4,506,910 | 3/1985 | Bierens | 267/64.27 X |
| 4,784,376 | 11/1988 | Ecktman | 267/64.27 |
| 4,787,606 | 11/1988 | Geno et al. | 267/64.27 |
| 4,787,608 | 11/1988 | Elliott | 267/64.27 |
| 4,798,369 | 1/1989 | Geno et al. | 267/75.27 X |
| 4,852,861 | 8/1989 | Harris | 267/64.27 |
| 4,890,823 | 1/1990 | Koschinat et al. | 267/64.27 |

FOREIGN PATENT DOCUMENTS

| 0296445 | 12/1988 | European Pat. Off. . |
| 2311670 | 12/1976 | France . |
| 0839745 | 6/1981 | U.S.S.R. . |
| 964138 | 7/1964 | United Kingdom . |
| 1231766 | 5/1971 | United Kingdom . |
| 1248025 | 9/1971 | United Kingdom . |

Primary Examiner—Douglas C. Butler
Attorney, Agent, or Firm—Wenderoth, Lind & Ponack

[57] ABSTRACT

A plunger piston system used, for example, to support and guide a pneumatic spring bellows of an air suspension axle of a commercial vehicle or the like, includes a plunger piston that has a cylindrical plunger piston skirt with a bottom foot region for connection with an air spring bearing arm and an upper plunger piston edge that adjoins the plunger piston edge that adjoins the plunger piston skirt. A trough section which extends radially inward from the edge has a trough base with an opening for the passage of a bolt for a force-fit connection with a base of the air spring bellows. The trough section defines a trough to accommodate a convex base of the air spring bellows. A supporting body fits in an inner space of the plunger piston is surrounded by the skirt thereof. A lower foot area of the supporting body rests on the lower foot area of the plunger piston. The plunger piston and the supporting body may be of plastic. The plunger piston is configures so as to be pot-shaped with an essentially cylindrical casing, and the supporting body is configures as a separate part of essentially truncated conical shape with a diameter that becomes smaller form the lower foot area to the trough base of the plunger piston. The upper base plate of the supporting body contacts the underside of the trough base of the plunger piston.

20 Claims, 4 Drawing Sheets

PLUNGER PISTON SYSTEM

This is a continuation-in-part of U.S. application Ser. No. 07/242,412 filed Sept. 9, 1988, now U.S. Pat. No. 4,890,823.

BACKGROUND OF THE INVENTION

The present invention relates to a plunger piston assembly or system used, for example, to support and guide a pneumatic spring bellows of an air suspension axle of a commercial vehicle or the like, and including a plunger piston that has a cylindrical plunger piston skirt with a bottom foot region for a connection with an air spring bearing arm and an upper plunger piston edge that adjoins the plunger piston skirt and which becomes, radially in an inward direction, a trough section that has a trough base that incorporates an opening for the passage of a bolt for a force-fit connection with a base of the air spring bellows, the trough section forming a trough to accommodate a convex base of the air spring bellows. A supporting body within an inner space of the piston is surrounded by the plunger piston skirt and has a lower foot area on the bottom foot area of the plunger piston.

More and more frequently, commercial vehicles are being equipped with air spring systems to increase the level of comfort provided thereby, to take advantage of the height adjustment and height control, to ensure optimal distribution of axle loads by means of compensation lines in multi-axle units, and to protect the surface of the road. Air spring axles within multi-axle assemblies can be raised in a simple manner by auxiliary systems in order to protect the tires.

Pneumatic springs can transfer only vertical forces. Other chassis elements are required in order to absorb all the other forces and moments. Known air suspension systems comprise primarily an air spring bellows that frequently includes a rubber buffer as a stop, a plunger piston, and a bearing arm that is, in turn, mounted on or under the vehicle. The air spring bellows is in the form of a rotationally symmetrical rubber sack that can be filled with air and that is connected to the vehicle frame by means of a steel plate that is fastened at the top as a force transfer element. A round steel base that can support the rubber buffer inside the air spring is clamped or vulcanized to the bottom of the bellows. The base has a convex underside that is a form fit in a correspondingly concave upper trough of the plunger piston and is securely bolted thereto.

In the usual steel version, the plunger piston is a rotationally symmetrical deep-drawn or extruded part, the surface of which is provided with corrosion protection. Its skirt, which is essentially cylindrical, is shaped so as to be slightly conical to the outside and then flanged inward in a semi-circle. Holes in the flanged edge facilitate connection to the plate-shaped end of the air spring bearing arm. In the upper section, the plunger piston skirt makes the transformation through an essentially semi-circular edge into a truncated conical trough with a level bottom, this serving to accommodate the convex trough of the air spring bellows. The base of the trough incorporates at least one drilled hole through which a screw bolt can be passed to form a friction fit connection between the plunger piston and the air spring bellows. When under compression, the base of the air filled spring bellows is friction fit in the trough of the plunger piston, whereas the side wall of the essentially cylindrical air spring bellows is slipped over the upper edge of the plunger piston and the essentially cylindrical plunger piston skirt. The plunger piston can move so deep into the air spring bellows that the rubber buffer in the air spring bellows is clamped between the upper steel plate and the plunger piston of the air spring bellows, thus forming an end stop. In such cases, shock loads exert a significant amount of stress directly on the surface of the trough base.

Because they are made of metal, such plunger pistons are relatively heavy and costly. Furthermore, metal plunger pistons can corrode in their rolling region after prolonged periods of use, and after the corrosion protection has worn off increased wear of the rubber sack can occur. Therefore, attempts have been made to develop a plunger piston of glass-fiber reinforced plastic, so as to reduce weight and production costs, as well as to increase the useful life of the entire air spring bellows, as a result of the smooth and corrosion-free surface of the plunger piston. In this regard, the outer shape of the plunger piston is similar to that of the embodiment that is of steel. However, the edge near the foot is not flanged, but its cross-section is approximately trapezoidal so as to ensure improved seating on the bearing arm plate. Perpendicular to the foot edge at most four ribs that are offset by 90° relative to each other extend along the inner surface of the skirt up to the upper edge of the plunger piston. In their lower section, the reinforcing ribs incorporate threaded holes or threaded inserts of metal, these being used for the bolted connection to the bearing arm plate.

In a further embodiment of a plunger piston of glass-fiber reinforced plastic, it has been proposed to incorporate a plurality of reinforcing ribs internally in the area of the upper rounded transition from the plunger piston skirt to the truncated conical trough. In the event of shock stresses however, breaks still occur at the upper stop at the transition from the plunger piston skirt to the truncated conical trough. On the other hand, it has also been seen that the base of the trough has been torn away on rebound, because the effective tensile force is transferred through the screw head and, optionally, a washer, from the air spring bellows directly to the trough base of the plunger piston. Besides these functional disadvantages, because of the numerous ribs, this embodiment of the plunger piston is almost as heavy as the steel version. Furthermore, the tool costs associated with the production of such embodiments of plunger pistons are extremely high.

In still another embodiment of a plunger piston of glass-fiber reinforced plastic, a pipe stub is molded into the interior of the piston, starting concentrically from the trough base. This pipe stub extends downward to the supporting arm plate and rests on such plate when subjected to a load. The object of this pipe stub is to transfer shocks from the base of the trough to the bearing arm plate and to remove the load from the edge area of the plunger piston. However, the disadvantage of this embodiment is that in the production process that is used, the reinforcing glass fibers do not get into the lower third of the pipe stub, so that it fails under elevated shock stresses. In addition, the dimensions of the pipe stub make it difficult to install the supporting arm plate on a parabolic link, which is necessary under some circumstances, e.g. when for structural reasons it should be so installed instead of on the supporting arm. For this reason, an area on the bottom edge of the short pipe has been subsequently notched, which of course further reduces the supporting effect.

GB-PS 1 231 766 describes a damped pneumatic spring with main and secondary chambers connected by an opening in a partition wall that separates them. The main chamber is formed by an air spring bellows, the base of which is connected with the base plate of a plunger piston that forms the second chamber that is closed up to the connection with the first chamber. The upper base plate of the plunger piston is welded to a lower cover plate through a pipe-like member. The plunger piston wall is formed in part form a wall section that is sharply curved and adjacent to the upper base plate, and in part from a flange area that slopes upwards from the lower cover plate. If this plunger piston system is to be used for supporting and guiding an air spring bellows incorporated in an air-sprung axle of a commercial vehicle or the like, the plunger piston and the pipe-like element must have extraordinarily thick walls in order to be able to withstand the stresses to which they will be subjected. Because of its construction, this know plunger piston arrangement is very heavy and entails very high production costs.

SUMMARY OF THE INVENTION

With the above in mind, it is the object of the present invention to develop a plunger piston system or assembly of the afore-mentioned type, of glass-fiber reinforced plastic or similar composite material, which even in extreme cases can absorb all the compressive and tensile forces that occur during the compression and rebound of air suspension axles of a commercial vehicle without incurring any damage, which can provide for the smooth sliding of the air spring bellows during all movements of the spring, without the air spring bellows becoming pinched, which also permits installation on a parabolic link, and which can be manufactured in a cost-effective manner.

According to the present invention, this object is achieved essentially in that the plunger piston and a supporting body are of plastic, preferably glass-fiber reinforced plastic or composite material, in that the plunger piston is pot-shaped with an essentially cylindrical casing, in that the supporting body is formed as a separate part of essentially truncated conical shape with a diameter that grows smaller from the lower foot area to the base of the trough of the plunger piston, and in that the upper base plate of the supporting body lies against the under side of the trough base of the plunger piston.

In this manner, the previous one-piece plunger piston, which was a costly design, has been replaced by a two-part version, both parts of which perform specific tasks, such that the outer plunger piston essentially manages the usual guiding of the air spring bellows during compression and rebound, whereas the truncated-conical supporting body that is bolted with the outer plunger piston to the lower convex air spring bellows plate essentially absorbs the compressive and tensile forces that can be especially damaging at the upper stop or during total rebound. Because of the fact that the upper base plate of the supporting body is adjacent to the under side of the plunger piston base plate, such two plates provide sufficient strength, because of their sandwich construction, with regard to the tensile stresses that result from sudden and total rebound. The outer lower edge of the supporting body that is positioned in the inside space of the plunger piston lies in the foot area of the plunger piston skirt so as to provide radial and axial stability to this edge area. Despite its simple rotationally symmetrical shape and the very simple construction method used as compared to the prior art, the solution according to the present invention exhibits far greater serviceability than embodiments known from the prior art. The supporting function is particularly effective because the foot area of the supporting body is braced upwardly and outwardly, relative to the lower foot area of the plunger piston. Effective savings of materials and effective absorption of the compressive and tensile forces is achieved, in particular, in that the supporting body is of essentially truncated conical shape, with a diameter that grows smaller form the lower foot area to the base of the trough of the plunger piston.

It is preferred that the supporting body be so configured as to be rotationally symmetrical and is arranged to be coaxial with the plunger piston, so that the forces involved are absorbed uniformly around the perimeter.

One special embodiment of the present invention provides that the plunger piston incorporates reinforcing ribs that re oriented radially inwards and are distributed uniformly about the periphery of the plunger piston, there being depressions in the face ends of such ribs to accommodate bolts for connection to the air spring bearer, and that in this foot area the supporting body is form-fitted at the foot region of the reinforcing ribs.

According to another feature of the present invention, the supporting body and one preferably circular stop rib that is incorporated at its bottom edge can be snapped in the manner of a snap-lock into at least a plurality of notched detent recesses that are distributed around the periphery of the foot area of the plunger piston skirt. Thus, the separate components, i.e. the plunger piston and the supporting member, form a structural and functional unit. The notched recesses can preferably be incorporated in the foot region of the reinforcing ribs. During simple assembly, this snap-in function is achieved in that the detent recesses are undercut, as viewed from below, i.e. from the side from which the supporting member is introduced into the interior space of the piston. In addition, the notched recesses can incorporate a lead-in slope so as to facilitate assembly. Furthermore, if the notched recesses form an upper stop edge for a preferably circular stop rib of the supporting member, there is a greater likelihood of the supporting member being supported on the plunger piston.

For the sake of simplicity during the assembly of the supporting body and the plunger piston, the base plate of the supporting body can have an opening that is coaxial with the opening within the trough base of the plunger piston, so as to allow passage of a bolt for a common force-fit connection with the base of the air spring bellows.

Another feature of the invention is that the base plate of the supporting body includes a central reinforcement, optionally with radial ribs and a circular ridge. This enhances the absorption of tensile forces that, during rebound, act through the central bolted connection between the air spring bellows and the plunger piston or the supporting body, i.e. on the base plate of the plunger piston or the base plate of the supporting body.

Good conditions for the transfer of forces can be provided if the upper side of the base plate has an annular area that surrounds its opening and supports the underside of the trough base of the plunger piston.

It is particularly advantageous if a shallow hollow space that encloses the opening is left free between the underside of the trough base and the upper side of the base plate the base plate being configured in the area of this hollow space that it compresses under the action of the bolt. This can be achieved, for example, if the base plate of the supporting body is slightly curved downward relative to the essentially flat base of the trough of the plunger piston. If the plunger piston and the supporting body are connected to each other and to a rubber stop by means of a bolt that passes through the openings provided at this location, then the base plate can be compressed. However, if the bolt is tightened from above, the base plate will remain flexible in the area of the space. Although the parts are clamped together in this manner, the air spring bellows with a hole for attachment to an upper steel plate and an air connection can be rotated radially relative to the plunger piston. This results in considerable simplification of construction and assembly because it becomes easier to adapt to the specific characteristics of a particular vehicle without any need to loosen and then tighten all the parts involved.

An additional guarantee against the base plate of the supporting body being torn away when under tension is achieved if the under side of the base plate of the supporting body is transformed through an arc with a large radius to the inner surface of the conical casing of the supporting body.

The annular cross-sectional area of the casing of the supporting body is preferably equal at every level of the truncated conical slope thereof, so that the greatest possible transfer of compressive and tensile forces is achieved for very low material costs. Essentially, this can be accomplished in that the inside surface of the casing of the supporting member is more sharply inclined relative to the vertical than the outer surface of the supporting body casing.

In addition, the present invention proposes that for reasons of production technology, the skirt of the plunger piston is inclined less relative to the vertical for a considerable part of its length and widens out conically in a wide-radius arc at its lower foot area. This widening of the lower area of the plunger piston increases the effective area of the air spring bellows if the plunger piston is plunged inwardly by a corresponding amount. This avoids violent impact against the rubber buffer, as can happen during total deflection.

In addition to the reinforcing ribs, the plunger piston can also have inwardly oriented stiffening ribs that preferably extend throughout the entire height of the plunger piston skirt, the inside contour of which ribs being matched to the contour of the outer surfaces of the supporting body casing. This makes it possible to achieve not only an additional enhancement of the resistance of the plunger piston skirt to moments, but also of its support on the supporting body. The stiffening ribs can be arranged as a continuation of the reinforcing ribs or can be arranged between the reinforcing ribs, preferably symmetrically, around the periphery. If, for all practical purposes, the ribs extend to the total height of the plunger piston skirt, the radial dimension of the stiffening ribs also extends through the interior space between the plunger piston skirt and the trough section as far as the trough base, so that the upper, rounded edge of the plunger piston is reinforced.

Of course it is also possible that, instead of or in addition to stiffening ribs on the plunger body, the supporting body may have stiffening ribs that re oriented radially outwards and that extend as far as the skirt of the plunger piston. Thus, in a embodiment of the present invention the supporting body can have reinforcing ribs that project radially outward and are distributed around the periphery of the supporting body casing, there being depressions in the faces of such ribs to accommodate bolts for connection with the air spring bearer, the foot area of the plunger piston being in a shape-locking fit with the foot area of the reinforcing ribs. These stiffening ribs do not have to extend throughout the full height of the supporting body, so that it is possible to achieve a further effective saving of materials, particularly in the case of large plunger pistons.

As another alternative, it can also be arranged that the base plate of the supporting body is configured so as to be concave and to have a middle, flat annular area that immediately surrounds its opening and that contacts the underside of the base of the trough of the plunger piston. This results in a favorable flow of forces when the plunger piston is under tensile stresses, particularly in the case of large plunger pistons.

BRIEF DESCRIPTION OF THE DRAWINGS

Additional objectives, features, advantages and application possibilities for the present invention are set forth in the following description of embodiments shown in the drawings appended hereto. All of the features described and/or shown, either singly or in any combination, are included within the scope of the present invention, regardless of the wording of the claims or references thereto. The drawings show the following:

FIG. 2b is a vertical cross section on the section line BB in FIG. 2a;

DETAILED DESCRIPTION OF THE INVENTION

Figure 1:
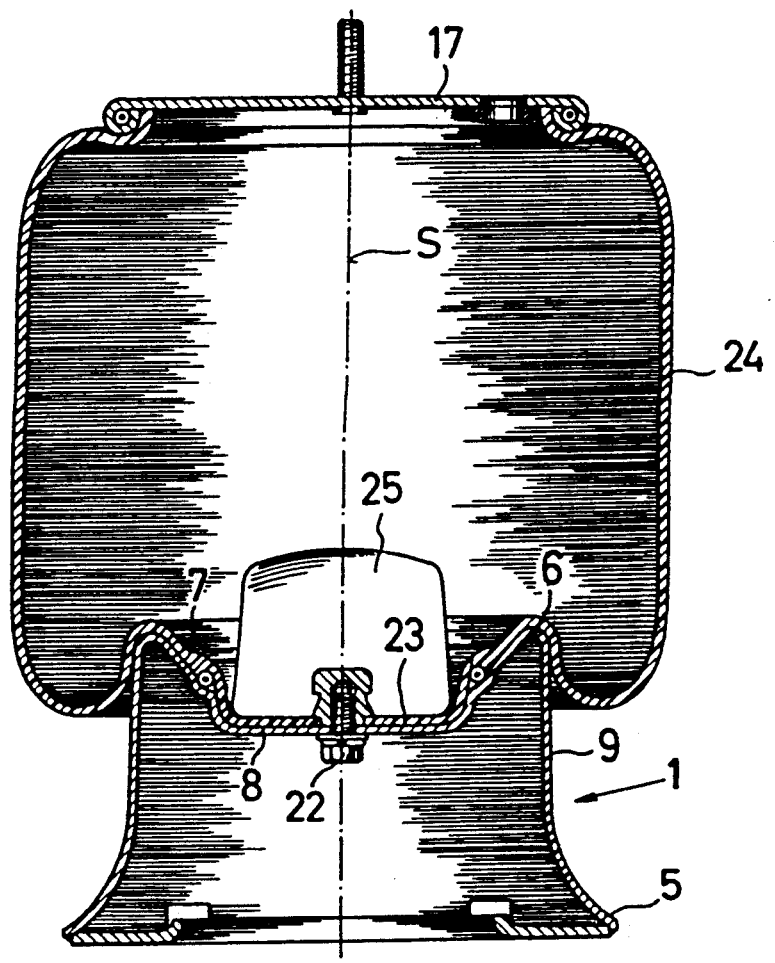
FIG. 1 is vertical cross-section of a complete air spring bellows with a plunger piston formed as a deep-drawn sheet metal body as in the prior art.

An air spring shown in figure 1 includes an air spring bellows 24 in the form of an air-filled, rotationally symmetrical rubber sack, which is to be connected through an upper flanged steel plate 17, as a force transfer element, to a vehicle frame (not shown). A convex, circular steel base 23 is vulcanized onto the underside of the air spring bellows 24, and this supports a rubber buffer 25 as a stop inside the air spring bellows 24. The underside of the base 23 is convex and is form fit in a correspondingly shaped upper trough base 8 of a plunger piston 1 and is bolted thereto to form a force fit by means of a bolt 22. The plunger piston 1 is a pot-shaped rotationally symmetrical deep-drawn part that is of steel. An essentially cylindrical skirt 9 of plunger piston 1 is shaped so as to be slightly conical to the outside and is then flanged in a semicircular shape to the inside. Drilled holes in the flanged edge enable connection to a plate-shaped end of an air spring bearing arm (not shown).

Figure 2A:
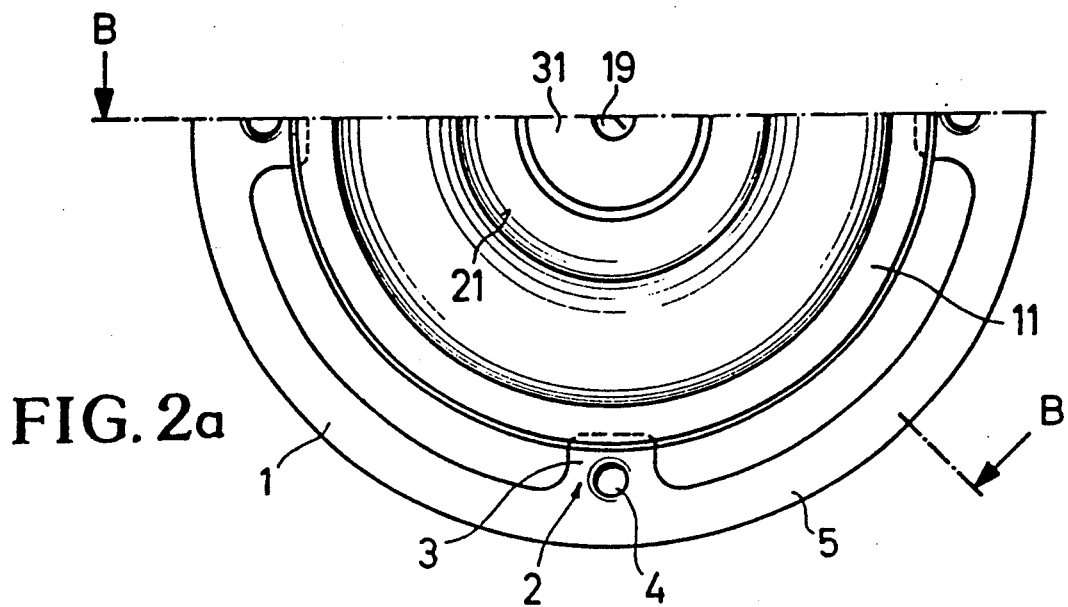
FIG. 2a is a section as seen from the direction A in FIG. 2b of a plunger piston system according to the present invention.
Figure 2B:
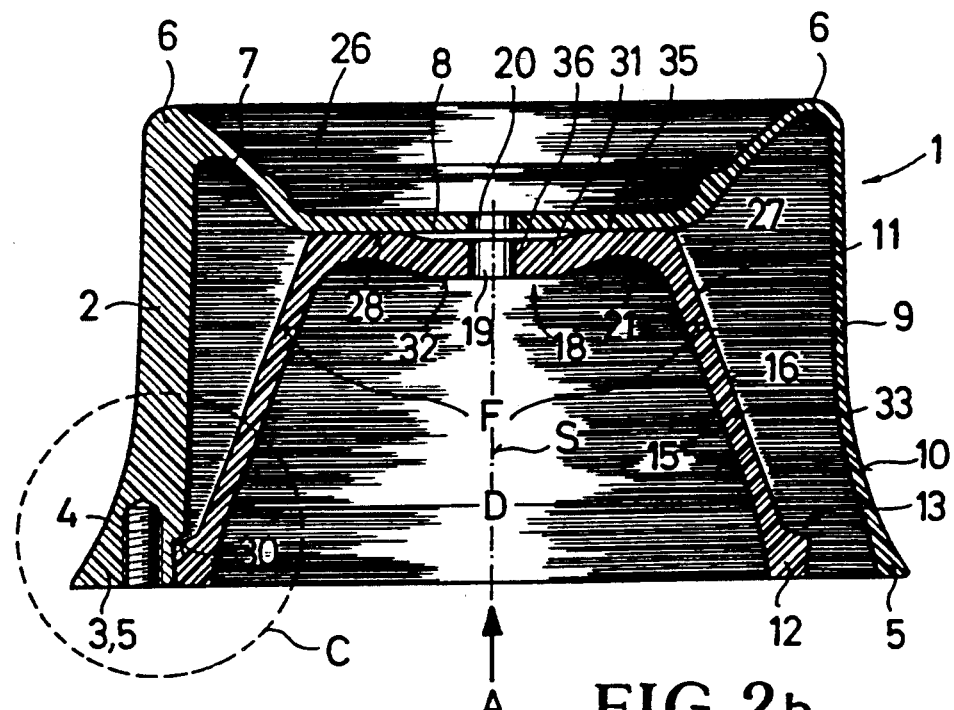
Figure 2C:
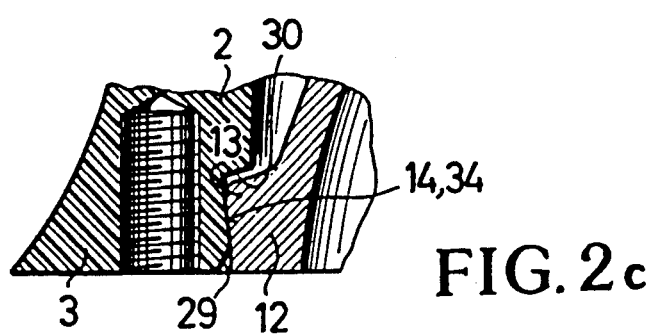
FIG. 2c is an enlarged detail of portion C in figure 2b.

The plunger piston system according to the present invention and shown in FIGS. 2a to 2c is intended for use with an air spring bellows system 17, 23, 24, 25 that is configured in essentially the same manner as that of FIG. 1. An outer, pot-shaped plunger piston 1 has four reinforcing ribs 2 that are displaced by 90° relative to each other, that are oriented inwardly, and that extend throughout the entire height of a skirt 9 of the plunger piston. In a foot area 3 of the reinforcing ribs 2 there are recesses 4 to accommodate threaded bolts (not shown) for connection with a bearer arm plate (not shown). At the top, the essentially cylindrical plunger piston skirt 9 makes a transition to become a rounded plunger piston edge 6 that is essentially semicircular in cross-section. Inclined inwardly from edge 6 is an essentially truncated conical trough section 7 connected to an essentially flat trough base 8 to form an essentially truncated conical trough 26 in which a convex base of an air spring bellows can be accommodated by a form fit. The plunger piston skirt 9 has a small inclination (e.g., approximately 1°) relative to the vertical S and widens in its lower foot area 5 outwardly in the shape of a cone with an arc 10 of a relatively greater radius (e.g., approximately 100 mm).

A hollow, truncated conical supporting body 11 is positioned within the plunger piston 1. Body 11 has an annular foot region 12 that has on its outer side of a stop rib 13 that is, for example, circular and can engage in corresponding detent recesses 14 on the inner sides of the foot areas 3 of the four reinforcing ribs 2. To this end, as viewed from below, each detent recess 14 includes a lead-in slope 29 that makes a transition to become an undercut 34 which in turn becomes a stop edge 30 for the upper side of the stop rib 13. Because of this detent and snap connection 13, 14, the two parts, i.e. the plunger piston I and the supporting body 11, can be connected rigidly but releasably by a shape fit and support each other upwardly and outwardly at the foot areas 3, 12.

The slope of an inner surface 15 of a casing 33 of the supporting body is greater than the slope of the outer surface 16 thereof to an extent such that the annular cross-sectional area F of the supporting body 11 remains constant at every level of the truncated conical supporting body 11.

An upper base plate 18 of the supporting body casing 33 abuts by its upper side 35, which is flat in an annular area, against a similarly flat annular area of the underside 28 of the trough base 8 of the plunger piston I. The base plate 18 has an opening 19 that is coaxial to an opening 20 in the trough base 8. A bolt (not shown) similar to bolt 22 of figure 1 is used to connect the two parts 1, 11 of the two-part plunger piston system with the base of the air spring bellows and can be passed through opening 19, 20. The base plate 18 is configured so as to be concave and resilient in the area of the opening 19, so that a shallow space 36 remains free between base plate 18 and the trough base 8. This space decreases somewhat when the bolt 22 is tightened to the rubber buffer in the direction of the base. The trough 26 defined by the trough section 7 of the upper portion of plunger piston 1 and the body 11 form a double cone assembly held in abutment at 35 and 8 due to snap engagement at 13, 14.

In order to enhance the absorption of tensile forces that act during rebound on the plunger piston system through the above-described central bolt attachment between the air spring bellows and the plunger piston 1 or the supporting body 11, i.e. on the trough base 9 or the base plate 18, the latter has a reinforcement 31 in its central area. The underside 32 of the base plate 18 makes a transition in an arc 21 of relatively large radius to join the inner surface 15 of the truncated conical supporting body casing 33. This construction ensures the highest degree of protection against the base plate 18 being torn away when subjected to tensile loads.

Figure 3A:
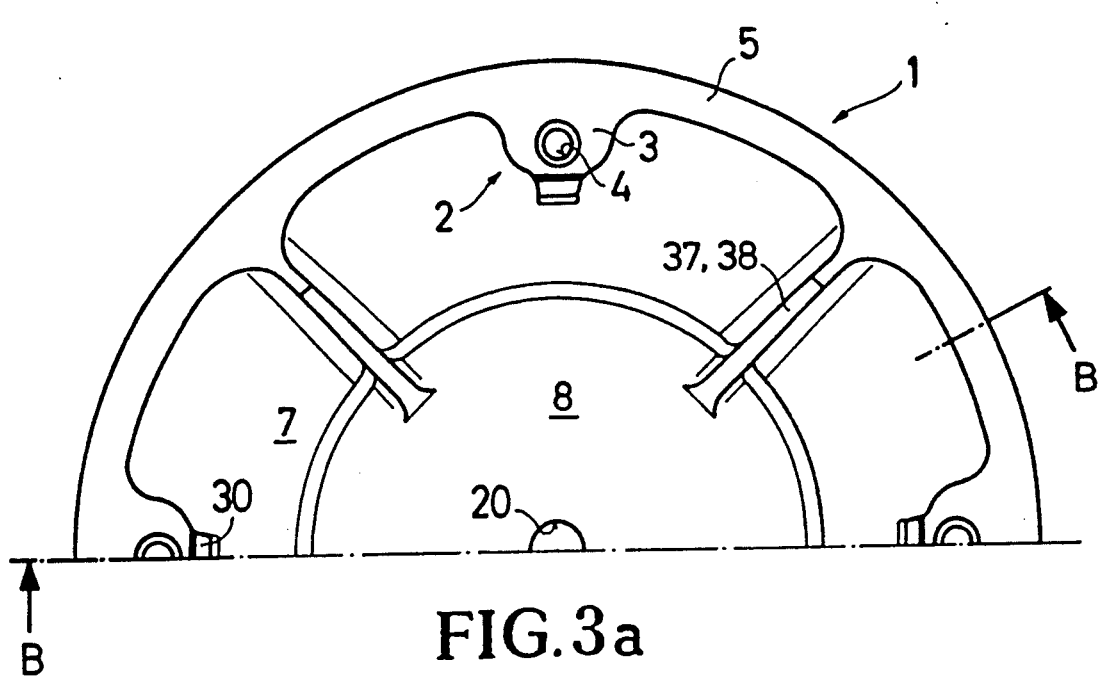
FIGS. 3a to 4b are views similar to FIGS. 2a and 2b of two other embodiments of the present invention.
Figure 3B:
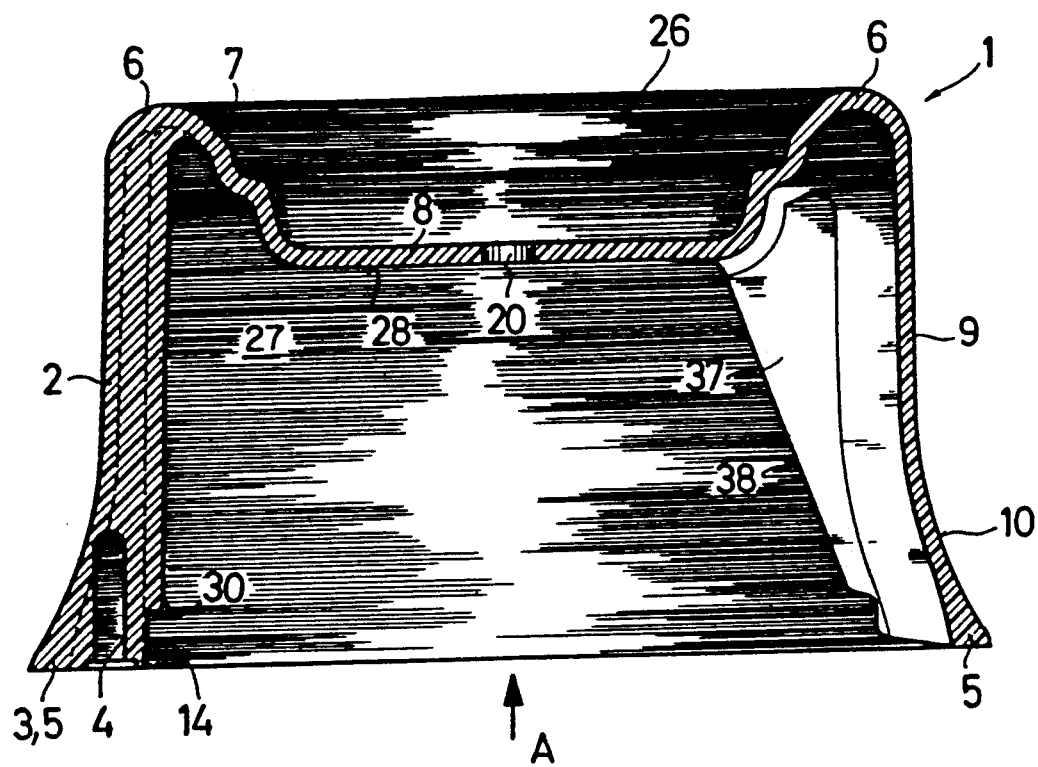

FIGS. 3a and 3b show another embodiment of a plunger piston 1, employable with but not illustrating the supporting body (II), as viewed from the direction A in FIG. 3b and along the section line B—B in FIG. 3a, respectively. In this case, the plunger piston 1 has additional stiffening ribs 37 that are distributed symmetrically to the reinforcing ribs 2 around the periphery of the piston. These stiffening ribs 37 are oriented radially inwards, and each of them has a radial dimension extending the entire distance between the plunger piston skirt 9 and the trough section 7. Ribs 37 contribute to increasing the resistance of the plunger piston 1. The inner shape 38 of the stiffening ribs 37 is matched to the shape of the outer contour of the outer surface 16 of the supporting body !1 so that the plunger piston 1 can rest on the outer periphery of the supporting body 11 through the stiffening ribs 37. In this case, the depressions 4 are not shown as being threaded, as is the case in the embodiment shown in FIGS. 2a to 2c, but rather self-tapping screws are intended to be used to produce the connection to the bearer arm plate.

Figure 4A:
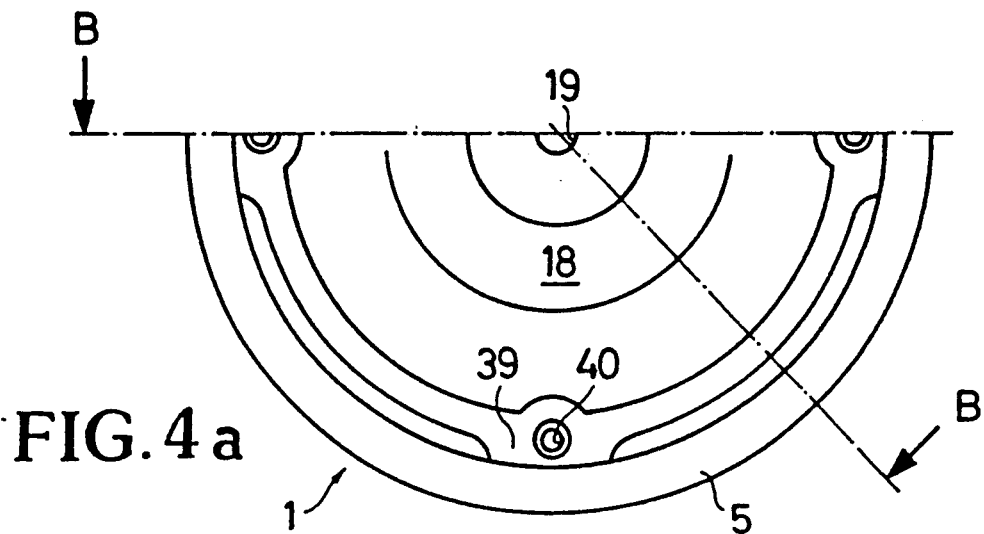
Figure 4B:
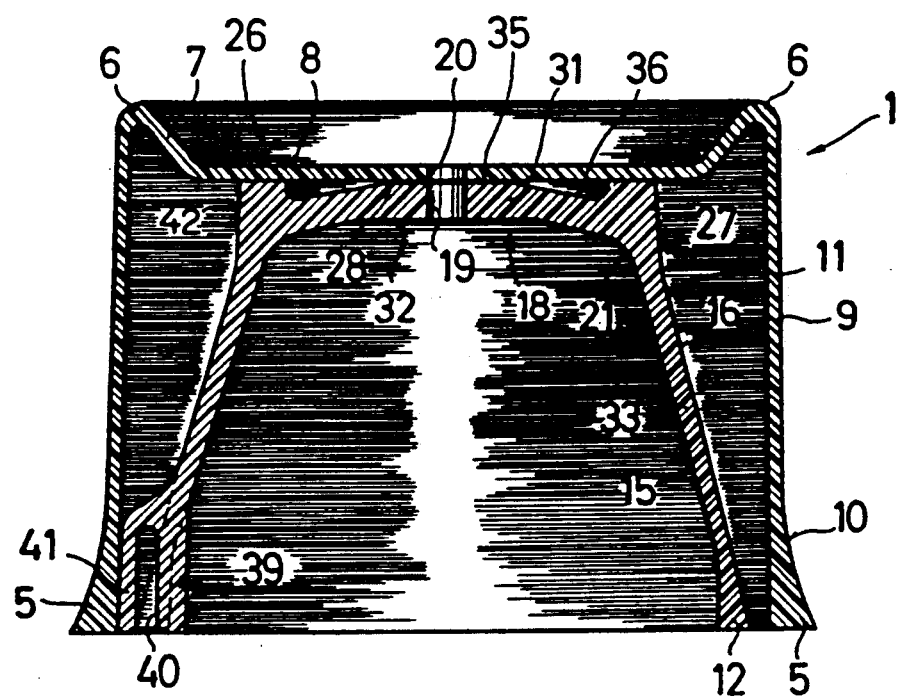

In the embodiment of the plunger piston system showing in FIGS. 4a and 4b, in the place of the provision of ribs on the plunger piston 1, the supporting body 11 has reinforcing ribs 39 that are distributed about the periphery of the supporting body casing 3 and which project radially outwardly, and in which are formed face end depressions 40 to accommodate bolts to produce the connection with the air spring bearer. The foot area 5 of the plunger piston 1 abuts to form a shape-locking fit on foot areas 41 of the reinforcing ribs. Seating thereon is enhanced by the external pressure that is exerted by the air spring bellows when it operates. The plunger piston 1 and the supporting body 11 are connected to each other only in the area of the trough base 8 and of the base plate 18, so as to be releasable during assembly on the base of the air spring bellows. In this case, the base plate 18 of the supporting body Il is configured so as to be slightly convex so that it has a center annular area 35 that surrounds its opening 19 and that contacts the underside 28 of the trough base 8 of the plunger piston 1. The upper portion of supporting body casing 33 is widened and extended beyond the base plate 18 to form a supporting ring 42 that has an outer annular surface contacting the underside 28 of the trough base 8. Of course, in this embodiment also it is possible that the plunger piston skirt 9, as in embodiment shown in figures 3a and 3b, be provided with stiffening ribs 37 that are oriented radially inwardly.

We claim:

1. A plunger piston assembly for use in supporting and guiding an air spring bellows of an air suspension axle of a vehicle, said system comprising:

a pot-shaped plunger piston formed of plastic material, said plunger piston including a substantially cylindrical skirt, a bottom foot portion at a lower end of said skirt for connection to an air spring bearing arm, an upper inwardly bent edge portion at an upper end of said skirt, and a trough section extending radially inwardly from said edge portion and having a trough base, thereby defining a trough to accommodate a convex base of the air spring bellows, said trough base having therethrough an opening for passage of a bolt for connection with the convex base of the air spring bellows;

a supporting body formed separately of said plunger piston of plastic material, said supporting body having a lower foot portion, an upper base plate and a substantially frusto-conical portion extending between and having a diameter decreasing from said lower foot portion to said upper base plate; and said supporting body being positioned within an inner space of said plunger piston and being surrounded by said plunger piston, with said lower foot portion of said supporting body contacting said bottom foot portion of said plunger piston, and with said upper base plate of said supporting body adjacent an underside of said trough base of said plunger piston.

2. An assembly as claimed in claim 1, wherein said plastic material is a fiber reinforced composite material.

3. An assembly as claimed in claim 2, wherein said plastic material is a glass fiber reinforced composite material.

4. An assembly as claimed in claim 1, wherein said plunger piston is substantially rotationally symmetrical and is arranged coaxially of said supporting body.

5. An assembly as claimed in claim 1, wherein said plunger piston includes reinforcing ribs extending inwardly from said skirt at positions spaced peripherally thereabout, each of said ribs having at a lower end thereof a foot area having therein a recess for use in connection to the air spring bearing arm, and said lower foot portion of said supporting body forming a shape-locking fit with foot areas of said ribs.

6. An assembly as claimed in claim 1, wherein said lower foot portion of said supporting body includes an outwardly extending annular stop ring, said bottom foot portion of said plunger piston has formed therein a plurality of peripherally spaced recesses, and said stop ring is snap fit in said recesses.

7. An assembly as claimed in claim 6, wherein said recesses are formed in foot areas at lower ends of reinforcing ribs extending inwardly from said skirt of said plunger piston.

8. An assembly as claimed in claim 7, wherein said recesses comprise notches each including a lower lead-in portion, an undercut portion above said lead-in portion, and an upper stop edge for said stop ring.

9. An assembly as claimed in claim 1, wherein said base plate of said supporting body has therethrough an opening coaxial with said opening in said trough base of said plunger piston, such that the bolt may pass through said openings for connection with the convex base of the air spring bellows.

10. An assembly as claimed in claim 1, wherein a middle portion of said base plate of said supporting body is reinforced.

11. An assembly as claimed in claim 1, wherein a flat annular area of an upper side of said base plate of said supporting body contacts a flat annular area of said underside of said trough base surrounding said opening therethrough.

12. An assembly as claimed in claim 1, wherein there is defined between an upper side of said base plate of said supporting body and said underside of said trough base a shallow circular space, and said base plate in the area of said circular space is elastic under the force generated to tighten the bolt.

13. An assembly as claimed in claim 1, wherein an under surface of said base plate of said supporting body merges into an inner surface of said frusto-conical portion of said supporting body.

14. An assembly as claimed in claim 1, wherein the cross-sectional area of said frusto-conical portion of said supporting body is constant through the eighth of said frusto-conical portion.

15. An assembly as claimed in claim 14, wherein said frusto-conical portion is defined by inner and outer surfaces, and said inner surface is inclined to the vertical by more than is said outer surface.

16. An assembly as claimed in claim 1, wherein said plunger piston includes stiffening ribs extending radially inwardly, each said rib having an inner contour complementary to an outer surface of said supporting body.

17. An assembly as claimed in claim 16, wherein said ribs extend throughout the height of said skirt of said plunger piston.

18. An assembly as claimed in claim 1, wherein said supporting body includes reinforcing ribs extending radially outwardly from said frusto-conical portion at positions spaced around the periphery thereof, and said bottom foot portion of said plunger position fits with lower foot areas of said ribs.

19. An assembly as claimed in claim 1, wherein said upper base plate of said supporting body has therethrough an opening, and an upper face of said upper base plate has an upwardly convex portion surrounding said opening and abutting said underside of said trough base of said plunger piston.

20. An assembly as claimed in claim 19, wherein said upper base plate further has extending upwardly a ring-shaped projection surrounding said upwardly convex portion radially outwardly thereof and abutting said underside of said trough base.

* * * * *